Oct. 14, 1958   R. CHARBONNIER   2,856,575
HIGH VOLTAGE DIRECT CURRENT GENERATORS
Filed Feb. 28, 1955
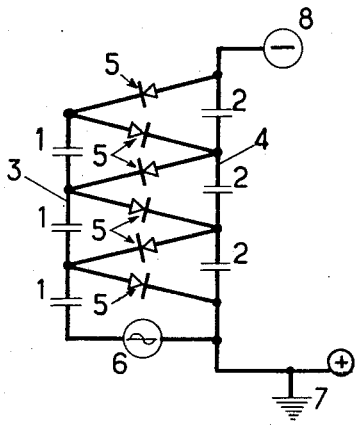
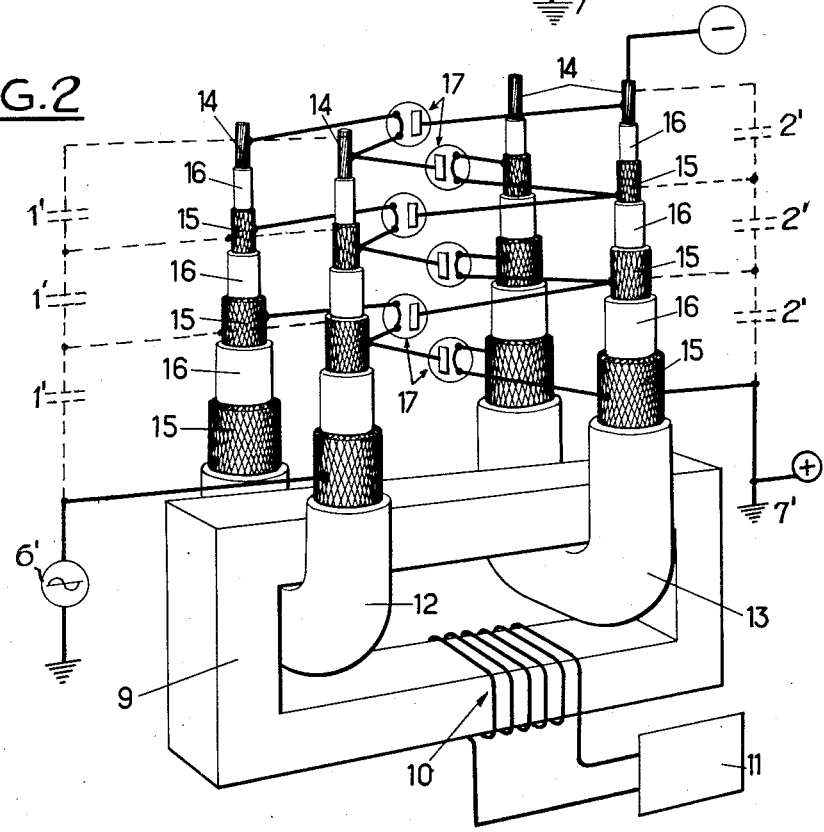
INVENTOR
ROGER CHARBONNIER
By Holcombe, Wetherill & Brisebois
ATTORNEYS United States Patent Office
2,856,575
Patented Oct. 14, 1958

2,856,575

HIGH VOLTAGE DIRECT CURRENT GENERATORS

Roger Charbonnier, Meudon-Bellevue, France, assignor to Rochar Electronique, Montrouge, France, a company Application February 28, 1955, Serial No. 491,125

Claims priority, application France June 21, 1954

5 Claims. (Cl. 321—15)

The object of my invention is a high voltage direct current generator which is easy to construct at a lower net cost.

At the present time high voltage direct currents are usually produced by one of the following two processes:

The rectification of a high voltage alternating current by means of a rectifier, generally a kenotron;

The use of electrostatic machines of different types transforming mechanical energy directly into high voltage electrical energy.

The advantage of the first method resides in the fact that it employs only static means. An improvement in this process consists in utilizing a source of alternating current which provides a much lower voltage than the direct current voltage which is desired to obtain and resorting to a combination of condensers and rectifiers known as a voltage multiplier and illustrated in Figure 1 of the attached drawings.

If, in a rectifier such as that illustrated in Figure 1, it is assumed that the D. C. output is equal to zero, the direct voltage in continuous operation is given by the formula:

$$V = U_e N \sqrt{2}$$

in which N is the total number of rectifiers employed (N is an even number if the elimination of substantial pulses in the resulting D. C. voltage is desired) and $U_e$ is the effective alternating voltage fed to the apparatus.

In this case, if the voltage $U_e$ is applied at the base of the left column, the direct voltage is withdrawn at the top of the right column and vice versa.

The advantages of this type of generator are the following:

Utilization of low voltage rectifiers;

Even distribution of the voltage throughout the length of the columns constituting the apparatus; and Lower impedance and lower voltage of the A. C. source.

This last consideration is also important in the case in which the A. C. source is not constituted by a transformer tuned to the general distributing network, but instead by a generator of a higher frequency falling, for example, between 1000 cycles and 1 megacycle.

On the other hand, a generator of this type presents a certain number of inconveniences:

The installation is more complicated than that of a simple rectifier and, in particular, brings about the necessity of using as many condensers as rectifiers;

The use of dry elements such as the selenium type as rectifiers involves a substantial net cost; and The use of vacuum tubes (rectifiers or kenotrons) requires the presence of an insulating transformer in order to furnish a heating coil separated by the vacuum tubes employed, the last tube of the columns requiring by itself very substantial insulation.

The object of the present invention is consequently the improvement of high voltage generators and especially of transformers designed for use in such generators to supply both the heat for the vacuum tubes and the capacitative connections between them.

A transformer of this type also permits the elimination of the condensers shown in Figure 1.

A transformer according to the invention is characterized by the fact that it comprises an A. C. primary and at least one secondary constituted by a cable having, in addition to a conducting core, at least one coaxial conducting sheath, each conducting sheath being insulated from the neighboring conductors (sheath or core) by a dielectric sheath.

Another object of the invention is the provision of a high voltage D. C. generator comprising rectifying means with heated cathodes, the source of current used to heat each cathode being constituted by one of the conducting elements (core or sheath) of a transformer cable of the above mentioned type.

One embodiment of the invention will now be described by way of example and is shown on the schematic drawing attached hereto, on which:

Figure 1 shows the circuit of a voltage multiplier of the classical type having six stages and delivering a negative voltage with respect to the ground;

Figure 2 is a perspective view showing one embodiment of a generator according to the invention and producing a negative voltage.

Figure 1 shows two "columns" of condensers 1 and 2 mounted in series.

The conductors 3 connected to the plates of the condensers 1 and the conductors 4 connected to the plates of the condensers 2 are connected together by the rectifiers 5. A source of alternating voltage 6 is provided to supply the assembly which is connected to ground at 7 and delivers a negative current at 8.

Figure 2 shows an embodiment of the invention according to which a six stage multiplier furnishes a negative voltage with respect to the ground and which corresponds to the classic circuit of Figure 1, but comprises a special transformer of the type forming the subject matter of my invention.

On Figure 2 reference numeral 9 shows a magnetic circuit. An alternating flux passes through this circuit, which is created by means of the coil 10 connected to a source of alternating voltage 11, such as the power line.

Each of two cables 12 and 13 of a special type which will be hereinafter described makes at least one turn about the magnetic circuit 9.

The cables 12 and 13 are made by one of the techniques commonly used for the manufacture of coaxial cables; they comprise a conducting core 14 and a series of coaxial conducting sheaths 15 insulated from each other and the core 14 by dielectric sheaths 16. Two successive conducting sheaths 15, separated by a dielectric sheath 16 constitute a cylindrical condenser. These several condensers are positioned in series by reason of the construction of the cable itself and in accordance with my invention they play respectively in each cable the role of condensers 1 and 2 of Figure 1. These condensers are symbolically indicated on Figure 2 by means of broken lines and assigned reference numerals 1' and 2' to indicate that they serve the purpose of condensers 1 and 2 in Figure 1. It will, of course be apprecnated that the condensers so shown are not in fact separate entities, but merely represent the inherent capacitance between the several sheaths, or between one sheath and the core.

If the two ends of the same conductive sheath are considered, there is a potential difference between them, since the said cable 15 makes at least one turn about the magnetic circuit 9, and since it forms a loop traversed by an alternating inductive flux.

This potential difference is, according to my invention, used to heat the rectifiers 17, such as rectifier tubes or kenotrons.

The rectifiers 17, which are of the same construction as the rectifiers 5 of Figure 1, are positioned as in Figure 1. The two terminals of the heating element of each cathode of the rectifiers 17 are respectively connected to the two ends of the corresponding conducting sheath 15 (or of the core 14), the two terminals being thus supplied with alternating current, while being brought to the high voltage potential of the corresponding cathode.

If the direction of current flow is reversed, that is to say, if the rectifying devices are respectively connected to the various conductive sheaths or cores in a direction opposite to that shown in Figures 1 and 2, it will be readily understood that a positive voltage may be obtained on the core of one of the conductors instead of a negative voltage, the negative terminal of the multiplier being then connected to ground.

It is clear that the connections to be made for heating the various cathodes must consequently be modified, so as to provide a circuit which is comparable to that of Figure 1, but which permits a positive voltage to be obtained in a conventional manner with the negative terminal connected to ground, instead of the negative voltage obtained by use of the arrangement of Figure 1, when the positive terminal is connected to ground.

If each rectifying "column" comprises N tubes, each cable should consist of $$\frac{N}{2}$$

cylindrical conductors 15 superposed on the core 14. These are of decreasing length, terminating in the rectifying "columns" at the height provided for the feeding of the filament of the corresponding tube 17.

The advantages of a device of this type are the following: the flux flowing in the magnetic circuit 9 is judiciously determined so that between the two ends of the central conductor 14 of each of the two cables, as well as between the respective ends of the superposed cylindrical conductors 15, there is a potential difference equal to the voltage fed to the filament of the tube 17; these are thus normally fed the heating voltage. By considering two successive tubes 17 heated by the same cable, it is easy to see that the average potential difference between two successive conducting sheaths 15 providing the heat is $2\sqrt{2U_e}$.

It is thus sufficient to provide between two successive conducting sheaths 15 an insulating layer 16 adequate to resist this voltage. The presence of this dielectric sheath 16 also constitutes, together with the two conducting sheaths which surround it, a cylindrical condenser which serves the same purpose as the condensers 1 (or 2) of Figure 1.

In other words, each cable 12 or 13 comprises a succession of insulating tubes 16 and conductors 14 or 15 assuring a regular distribution of the voltage from the central conductor 14 to the periphery, the capacitance between the different conducting elements replacing the connecting condensers of the known assembly of Figure 1.

The outermost conducting sheaths 15 also serve as the second plate, on the one hand, of the outermost of the condensers 1', through which outermost condenser the apparatus is supplied with an alternating current from a power source 6' and, on the other hand, of the outermost of the condensers 2' connected in series to the ground at 7'. It will of course be appreciated that the condensers 1' and 2' are not present as separate entities, since the conductors 14 and 15 constitute effective condensers when separated by the insulating sheaths 16.

For the reason which has already been indicated, if N is the total number of tubes 17, each cable is constituted by $$\frac{N}{2}$$

cylindrical conductors 15 in addition to the central conductor 14, that is to say, one conductor more than the number of tubes 17 of each "column."

It has been previously mentioned that in the heating transformer according to my invention, each of the two cables 12 and 13 make only one turn about the magnetic circuit (a single loop). Since most of the tubes ordinarily used require a substantial heating voltage, the number of turns which each of the cables makes about the magnetic circuit may be increased without departing from the spirit of my invention.

Recourse may also be had to two separate transformers, each having one of the cables for its secondary.

By way of illustration, it may be mentioned that a cable of the type of cables 12 and 13 may be manufactured by helically winding on a rigid central conductor such as a copper tube, a strip of polyethylene which is sufficiently wide and well overlapped that the leakage path is long.

On this polyethylene strip is wound a metallic ribbon on which, in turn, is wound a second helix of polyethylene, and so forth.

Other methods of manufacture may be used. A metallic strip may, for instance, be wound on a tube of dielectric material.

A high voltage D. C. generator according to my invention may be used, for example, in the following devices:

Electrostatic dust collector
Electrostatic coating machine
Accelerator for nuclear particles
X-ray generator These applications are of course listed by way of example, and the invention is not limited thereto.

In the case of an X-ray generator, the central conductor 14 of one of the cables of the heating transformer may also serve to heat the cathode of the X-ray tube, either directly or through a regulating auto-transformer.

It will of course be understood that various minor changes, improvements and additions may be made in the embodiments of my invention described herein, and certain parts thereof replaced by equivalent parts, without departing from the spirit of my invention.

I claim:

1. A device of the voltage multiplier type for producing high voltage direct current, comprising a transformer having a primary coil and at least two secondaries electrically insulated one from the other, each secondary consisting of a cable segment having two free ends and comprising an electrical conductor which serves as a core and at least one hollow conductor concentric therewith, each end of all but one of the conductors of each of said secondaries being connected to the other end of the same conductor of the same secondary through the cathode of a rectifying tube, the anode of which tube is connected to a conductor in the other secondary, thereby forming a single continuous pathway connecting all of the conductors of one secondary and all but one of the conductors in the other secondary and capable of transmitting an electric current in one direction only, the conductors of each secondary being otherwise completely insulated from each other by means of intermediate dielectric sheaths.

2. A device as claimed in claim 1 in which each of said secondaries comprises a plurality of hollow conductors and in which one end of each conductor of both secondaries other than the outermost conductor is connected to the other end of the same conductor through a cathode.

3. A device as claimed in claim 2 in which one of said outermost conductors is connected to an anode and to ground and both the other outermost conductor and the primary are connected to sources of alternating current.

4. A device as claimed in claim 1 in which each of said secondaries comprises a plurality of hollow conductors and in which one end of each of all but the innermost conductor of one secondary and of each of all but the outermost conductor of the other secondary is connected to the other end of the same conductor through a cathode.

5. A device as claimed in claim 4 in which the outermost conductor which heats a cathode is connected to ground and both the other outermost conductor and the primary are connected to sources of alternating current.

References Cited in the file of this patent

UNITED STATES PATENTS

| | | |
|---|---|---|
| 2,305,720 | Lindenblad | Dec. 22, 1942 |
| 2,356,558 | Bahring | Aug. 22, 1944 |
| 2,564,881 | Cronshey et al. | Aug. 21, 1951 |
| 2,719,275 | Hartmann | Sept. 27, 1955 |